350-331
PWE47
SR
XR 4,122,524

United States Patent [19]
McCrory et al.
[11] 4,122,524
[45] Oct. 24, 1978

[54] SALE COMPUTING AND DISPLAY PACKAGE FOR GASOLINE-DISPENSING APPARATUS

[75] Inventors: Rollin J. McCrory; Ronald S. Harmon; Gordon S. Vaughan, all of Greensboro, N.C.

[73] Assignee: Gilbert & Barker Manufacturing Company, Greensboro, N.C.

[21] Appl. No.: 738,562

[22] Filed: Nov. 3, 1976

[51] Int. Cl.[2] ........................ G01F 1/00; G02F 1/13
[52] U.S. Cl. ........................ 364/465; 350/332
[58] Field of Search ............... 235/151.34; 340/324 R, 340/366 E, 336; 222/23; 350/160 LC; 364/465

[56] References Cited

U.S. PATENT DOCUMENTS

| | | | |
|---|---|---|---|
| 3,524,726 | 8/1970 | Koster | 350/160 LC X |
| 3,580,421 | 5/1971 | Bickford | 340/336 X |
| 3,662,157 | 5/1972 | Somers | 235/151.34 X |
| 3,663,086 | 5/1972 | Assouline et al. | 350/160 LC X |
| 3,738,099 | 6/1973 | Tanaka | 340/324 M X |
| 3,751,642 | 8/1973 | Todd et al. | 235/151.34 |
| 3,758,195 | 9/1973 | Hedman, Jr. et al. | 340/336 X |
| 3,770,961 | 11/1973 | Westell | 350/160 LC X |
| 3,809,866 | 5/1974 | Scoville | 235/151.34 |
| 3,835,465 | 9/1974 | Tannas, Jr. et al. | 350/160 LC X |
| 3,838,565 | 10/1974 | Carlyle | 350/160 LC X |
| 3,863,246 | 1/1975 | Trcka et al. | 340/336 X |
| 3,918,041 | 11/1975 | Mao | 350/160 LC X |
| 3,928,658 | 12/1975 | van Boxtel et al. | 350/160 LC X |
| 3,935,435 | 1/1976 | Greenwood | 235/151.34 |
| 3,938,136 | 2/1976 | Kawakami | 350/160 LC X |
| 3,947,091 | 3/1976 | Trcka | 350/160 LC |
| 3,957,351 | 5/1976 | Stockwell | 350/160 LC |
| 3,963,324 | 6/1976 | Fergason et al. | 350/160 LC |
| 4,029,393 | 6/1977 | Dungan et al. | 350/160 LC |

*Primary Examiner*—Edward J. Wise
*Attorney, Agent, or Firm*—Finnegan, Henderson, Farabow & Garrett

[57] ABSTRACT

Sale computing and display apparatus for gasoline-dispensing equipment utilizing a rotatable shaft for metering the amount of gasoline dispensed and a unit price adjusting mechanism cooperating with the rotatable shaft for providing the sale price of gasoline being dispensed as a function of the rotation of the shaft; a pulser responsive to the unit price adjusting mechanism and the rotations of the shaft for providing pulses representative at least of the sale price of the gasoline being dispensed; at least one sale display device, including a light-transmissive liquid crystal display panel, having a planar viewing surface and utilizing a prism for backlighting the display panel; electronic logic for receiving the pulses, computing the sale and supplying signals for actuating the display panel; and electrical safeguards complying with the requirements for intrinsic safety. The display panel is resistively heated and includes a light-diffusing sheet and a blue-light neutralizing sheet. An auxiliary bar graph of sequentially lighted points of light is correlated with the advancing total of the sale, the lights each representing two cents of sales through ten cents and repeating as the total reflected by the display panel increases. The apparatus has particular utility for replacement of outmoded mechanical devices in existing gasoline pumps.

44 Claims, 13 Drawing Figures

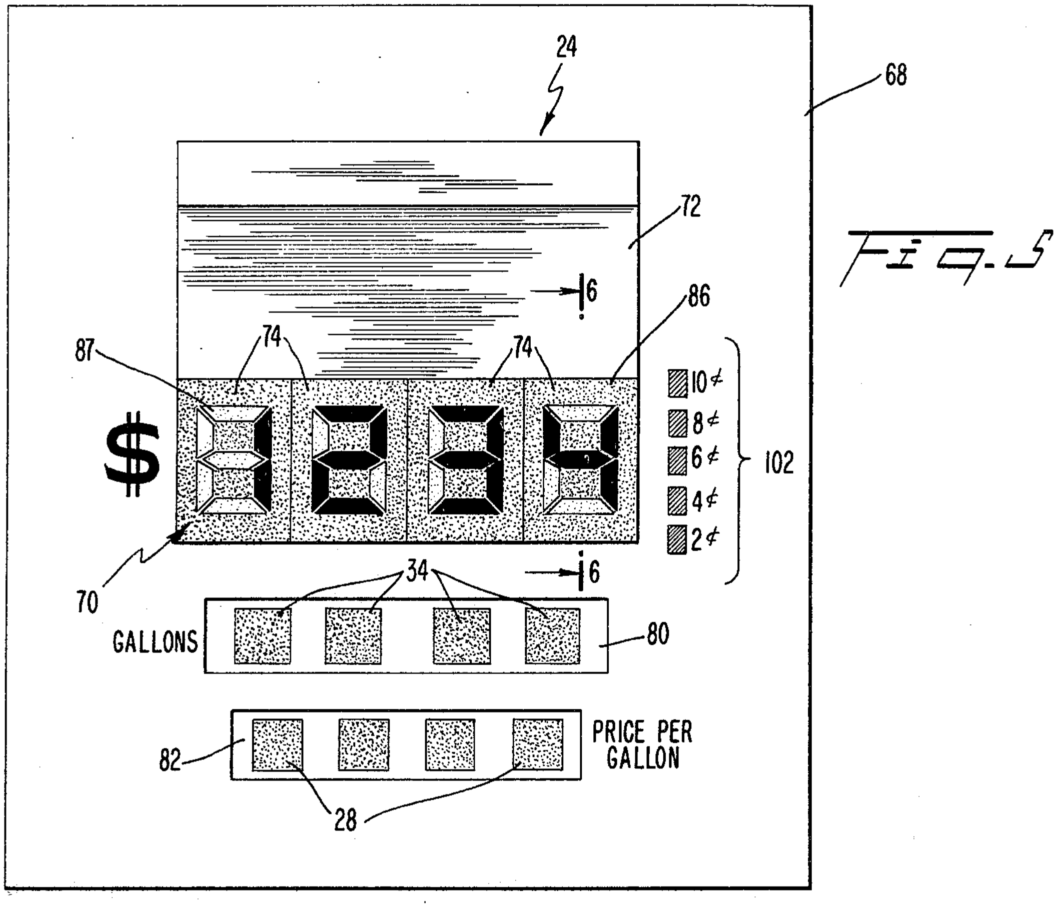
Fig. 5
Fig. 7
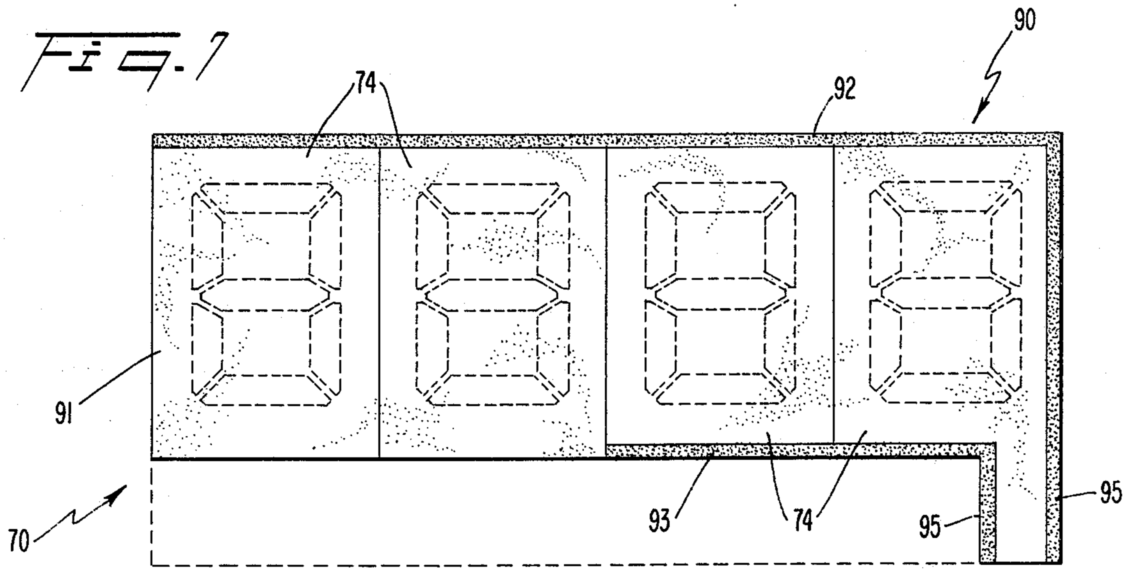

Fig. 9
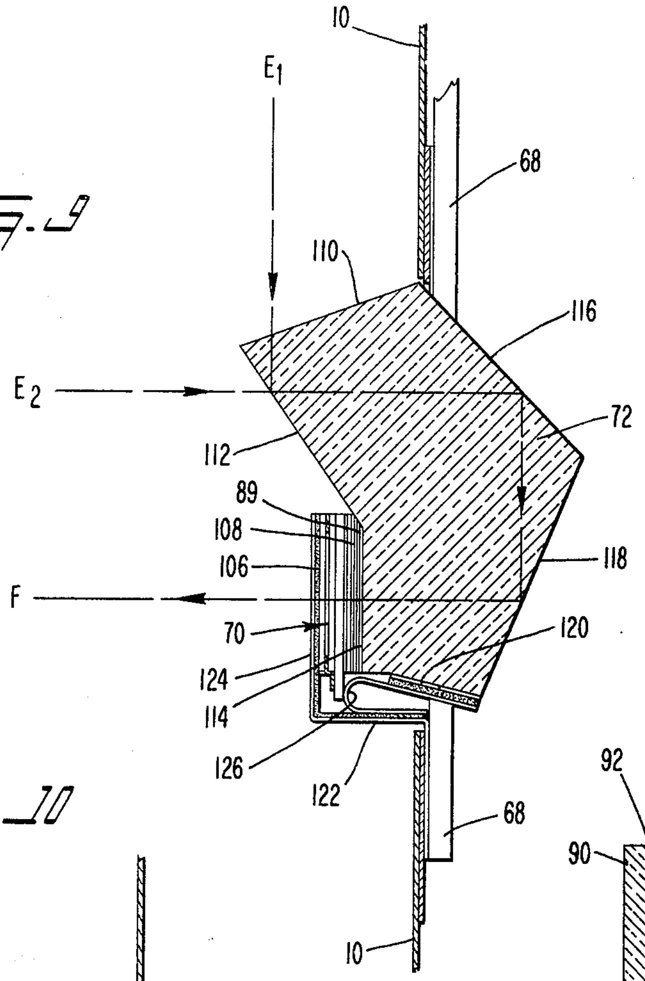
Fig. 10
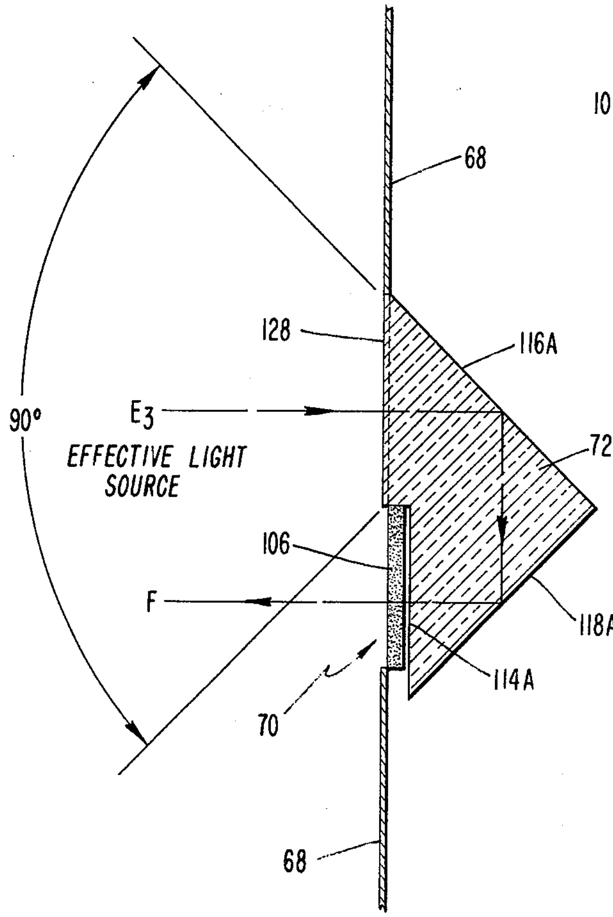
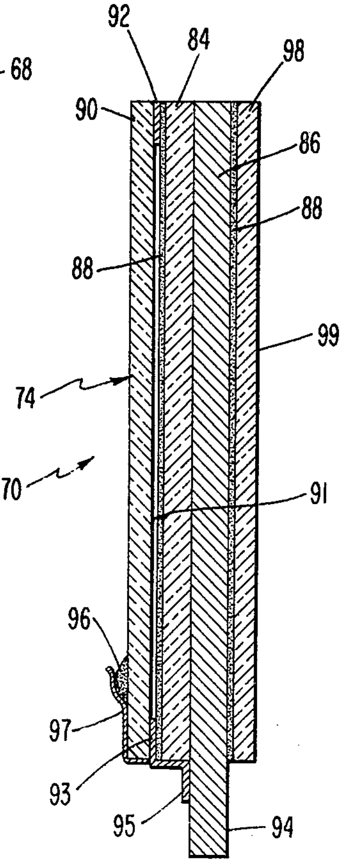
Fig. 6

SALE COMPUTING AND DISPLAY PACKAGE FOR GASOLINE-DISPENSING APPARATUS

BACKGROUND OF THE INVENTION

1. Field of the Invention

This invention pertains to apparatus for calculating and displaying the amount of the sale of gasoline dispensed from a pump and, more particularly, to such apparatus including electronic computation and liquid crystal display.

2. Description of the Prior Art

The economic need for increasing efficiency in all aspects of petroleum production, refining, transportation and distribution has become more intense with the increasing cost of petroleum and ever-increasing labor cost.

In the retailing of gasoline, the computation of the amount of gallonage and the sale price of gasoline dispensed is still made mechanically through gear wheels in most gasoline pumps. Moreover, the display of the result of the computations is also made through read-out wheels. Although devices and methods have been developed for calculating electronically the amount and price of gasoline dispensed through the pump, the replacement of the entire pump is extremely expensive. The development of better display of the gallonage dispensed and the sale price has been hindered by the requirement for intrinsic safety and the lack of background lighting in the totally enclosed dispensing apparatus, such as an electric pump.

Most mechanical apparatus still in use in gasoline pumps often does not have the capacity to compute and display the total price at present prices per gallon. Many gasoline pumps now in use have read-out wheels with a maximum capacity of $9.99. There is not room in this present apparatus for the mechanical expansion of counting and read-out wheels to increase this maximum capacity.

A difficulty of at least equal importance arises from the fact that the increasing price of gasoline has the effect of driving the mechanical computation devices and the read-out wheels at much higher rates than was intended in their construction. For this reason, the mechanical parts, even of new units, are wearing out very rapidly with the necessity of replacing parts with outmoded elements.

Yet another problem with high count rates is that a scrambling of data has been found to occur as the mechanical computing apparatus runs at speeds above that originally intended, and wear factors affect the precision of the mechanical computations. What often results is that the dollar read-outs on opposite sides of the pump will differ.

With the increased rate of turning of the read-out wheels, it is increasingly probable that the maximum purchase price given by the customer will be overrun. It is therefore desirable to have read-out devices that clearly and accurately reflect the sale as it is developing. This is particularly true in self-service equipment where nonexperienced customers are dispensing the gasoline and simultaneously trying to read the dials.

With the increasing cost of gasoline, it is foreseeable that the price will reach and exceed $1.00/gallon. Most present gasoline pumps have a maximum price capacity/gallon of 99.9 cents. Provisions must be made quickly to provide gasoline pumps which will dispense gasoline if the price reaches $1.00/gallon.

The provision of electronic computing and display ability in conjunction with a gasoline pump is complicated by the requirement of intrinsic safety in electrical circuits and equipment in the dispensing of gasoline. The standard for intrinsically safe electrical circuits and equipment for use in hazardous locations (UL 913) applies to the dispensing of gasoline. As such, the standard provides that any conceivable short or malfunction which could cause an arc to occur may not have enough available energy to ignite a stoichiometric mixture of gasoline and air. This intrinsic safety greatly limits the interrelated voltage and amperage of electrical circuits and elements which may be used in gasoline pumps. (See, for example, FIG. 15.1 of Part II of Standard UL 913-Underwriters' Laboratories.)

Liquid crystal display panels have very low voltage operation and very low power dissipation, but do not themselves emit light. Such panels have in the past been thought to have no utility for sale display of gasoline-dispensing apparatus because it was thought that artificial light would have to be supplied behind them, i.e., from an area subject to the intrinsically safe standards. In addition, the light emitted from a liquid crystal display panel has been polarized and is visible only from directly in front of the panel. As such, the panel could not be used for general viewing purposes.

There is, therefore, a pressing need for a modern sale computing and display package which can be fitted into gasoline-dispensing apparatus currently in use with minimum modification and expense, while complying with the intrinsically safe requirements.

SUMMARY OF THE INVENTION

Accordingly, it is the primary object of this invention to provide a sale computing and sale display package utilizing modern electronic techniques which can be fitted into current gasoline-dispensing apparatus metering the gasoline dispensed by the revolution of a shaft, with minimum modification and expense, and which is intrinsically safe.

It is another object of this invention to improve apparatus for monitoring the revolutions of a shaft and for providing a display of data derived from the number of revolutions of the shaft.

It is a further object of this invention to improve the sale display of gasoline-dispensing apparatus, while conforming to the rules of intrinsic safety.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, apparatus for monitoring the revolutions of a shaft is improved by the combination comprising pulser means for providing pulses proportional to the rotations of the shaft; display means, including a light-transmissive liquid crystal display panel; prism means for back-lighting the display panel, and electronic logic means for receiving pulses from the pulser means and supplying signals for activating the display panel.

It is preferred that the improved combination include means for rendering the pulser means, the display means, and the electronic logic means intrinsically safe in explosively hazardous locations.

It is also preferred that the liquid crystal display panel includes heating means, a light-diffusing viewing surface, and a plurality of segmented characters and means for blocking "blue" light from transmission through unactivated segments of the segmented characters.

In the preferred embodiment of the invention, sale computing and display apparatus for gasoline-dispensing equipment, utilizing the rotatable shaft known in the art for metering the amount of gasoline dispensed, comprises a unit price adjusting mechanism cooperating with the rotatable shaft for providing the price per gallon of gasoline dispensed as a function of the rotation of the shaft; a pulser responsive to the unit price adjusting mechanism and the rotations of the shaft for providing pulses representative at least of the sale price of the gasoline being dispensed; at least one sale display device including a light-transmissive liquid crystal display panel and means for back-lighting the display panel; electronic logic for receiving the pulses, computing the sale and supplying signals for actuating the display panel; and electrical safeguards complying with the requirements of the Underwriters' Laboratories for intrinsic safety in hazardous location.

Each sale display device includes an optical prism for receiving light incident thereon, transmitting and reflecting the light outwardly through the back of the display panel. In current gasoline-dispensing equipment, the incidental light will originate forward of the viewing surfaces.

The optical prism of the present embodiments of the invention is effective to transmit light incident thereon received along an arc of at least 90°, and preferably 180°, in a plane normal to the viewing surface.

In a preferred embodiment, the prism includes two or more light-transmitting planes extending outwardly from the plane of the viewing surface and intersecting at an angle for transmitting and reflecting ambient light rearwardly into the prism for reflection outwardly through the liquid crystal display panel.

In a further preferred embodiment, the liquid display panel is electrically heated responsive to the ambient temperature to improve the reaction time of the panel, a light diffusing sheet is added to the display panel on the viewed face to provide readability at angles other than normal to the surface, and the transmission of "blue" light through the display panel is blocked.

BRIEF DESCRIPTION OF THE DRAWINGS

The accompanying drawings, which are incorporated in and constitute a part of this specification, illustrate at least one preferred embodiment of the invention and, together with the description, serve to explain the principles of the invention. Of the drawings:

FIG. 5 is a front view of the display apparatus of the invention;

FIG. 7 is a plan view of the heater sheet of the liquid display panel of FIG. 6;

FIG. 8*a* is a schematic representation of the reflection of light from the surface of a glass panel;

FIG. 8*b* is a graph showing relative intensity of light at various dispersion angles for incident angles of 40°, 50° and 60° for the light-diffusing sheet of the liquid crystal display panel of FIG. 6;

FIG. 9 shows a side view of one embodiment of the display device of FIG. 5;

FIG. 10 shows a side view of another embodiment of the display device of FIG. 5.

DESCRIPTION OF THE PREFERRED EMBODIMENT

Reference will now be made in detail to the present preferred embodiment of the sale computing and display apparatus of the invention, an example of which is illustrated in the accompanying drawings.

Figure 1:
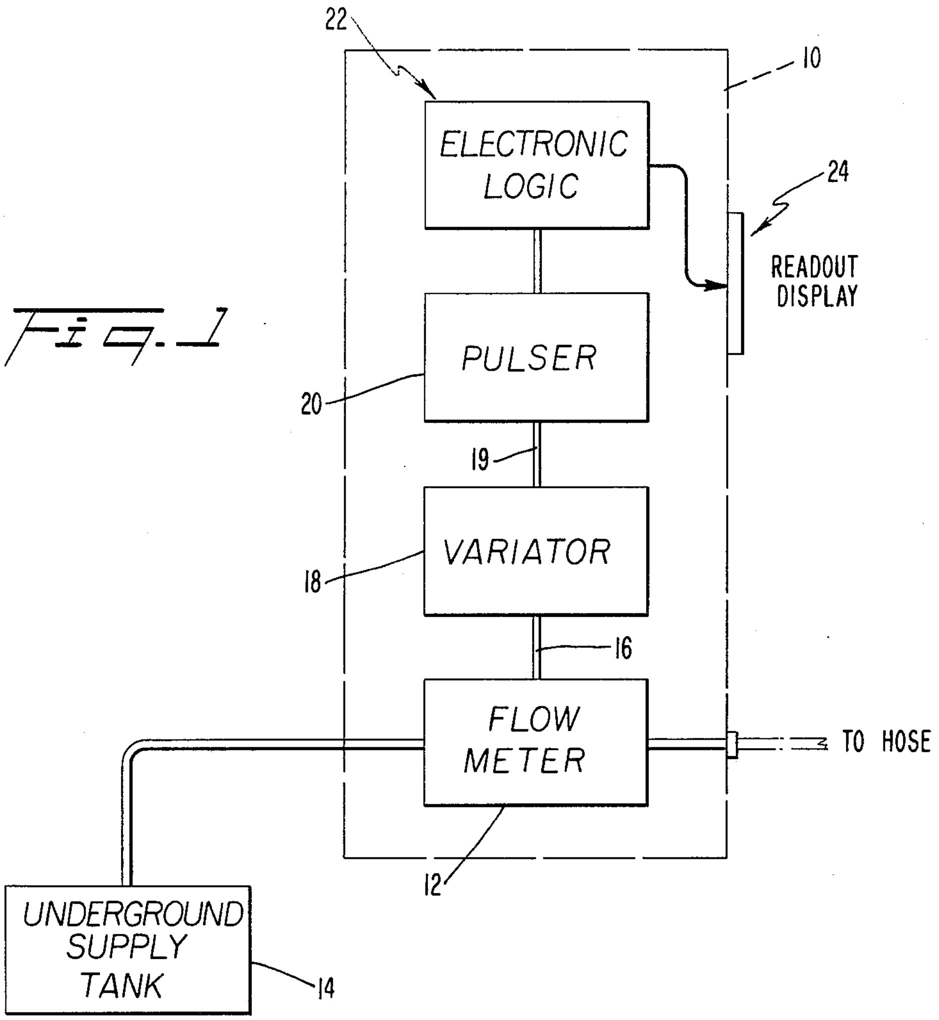
FIG. 1 is a schematic representation of gasoline-dispensing apparatus incorporating the sale computing and display package of the invention.

The gasoline-dispensing equipment in which the sale computing and display apparatus of the instant invention may be incorporated is shown schematically in FIG. 1. Such equipment includes a gasoline pump housing 10, a flow-meter 12 for measuring the gasoline being dispensed from an underground supply tank 14 to a hose. The flow-meter 12 turns a shaft 16 as a function of the volume of gasoline being dispensed, as known in the art, for example, at a rate of 1/10 gallon per revolution of the shaft.

The revolutions of the shaft 16 per gallon are converted into revolutions of a shaft 19 per fraction of a dollar, for example, 1/10 of a cent per revolution according to the price per gallon, ordinarily by known mechanical apparatus, such as a variator 18. The revolutions of the shaft 19 are converted into analogous pulses by a pulser 20, which pulses are converted by electronic logic 22 into signals utilized by the read-out display 24.

Alternatively, as discussed hereinafter, the mechanical apparatus 18 and the pulser 20 may be entirely replaced by electronic logic.

Figure 2:
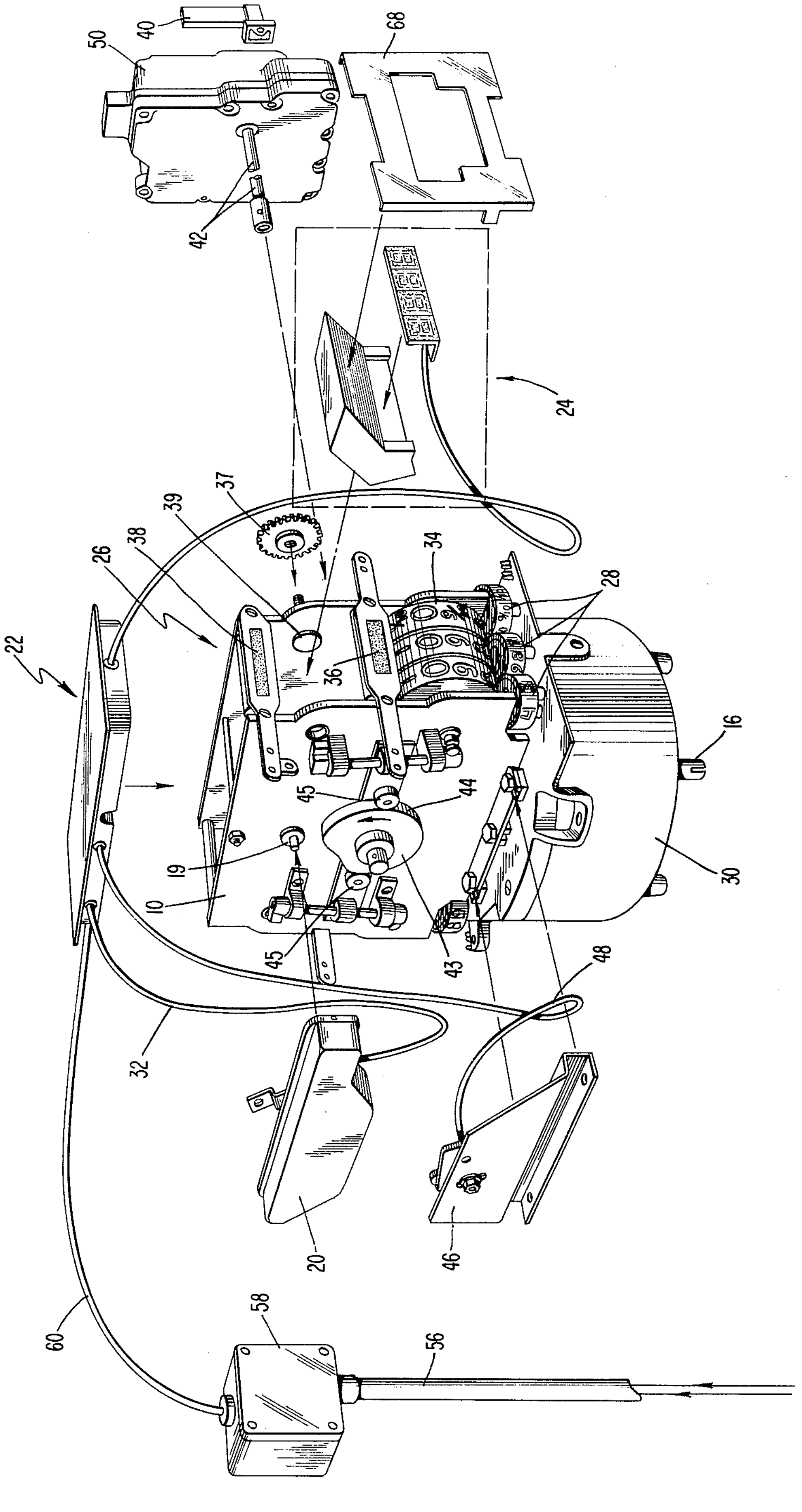
FIG. 2 shows an exploded perspective view of the sale computing and display package of the invention for gasoline-dispensing apparatus.

In accordance with the invention and referring to FIG. 2, it will be seen that the sale computing and display apparatus of the invention includes electro-mechanical apparatus, numbered generally as 26, an electronic logic package numbered generally as 22, and a liquid crystal display device as the read-out display, numbered generally as 24.

In the environment of gasoline-dispensing apparatus, the electro-mechanical apparatus 26 includes the internal housing 10 with unit price-indicating wheels 28, as known in the art.

In accordance with the invention, the liquid crystal display device 24 of the invention has been installed in the internal housing 10 in the space previously occupied by the mechanical read-out wheels. The internal housing 10 and other equipment of the gasoline-dispensing apparatus described herein are customarily enclosed in an outer housing consisting primarily of sheetmetal and glass, not shown.

The housing 10 contains space for the mechanical pricecomputing apparatus 18, known in the art as a variator and normally contained in the lower section 30 of housing 10 along with the price-changing mechanism. The variator 18 typically converts the revolutions of the shaft 16 driven by the flow-meter 12 of the gasoline-dispensing apparatus into the cost of the gasoline being dispensed, as represented by the revolutions of the output drive shaft 19. The mechanical unit price-changing apparatus of the art is, of course, directly connected to the price-indicating wheels 28, as known.

Such mechanical apparatus is included, for example, in the Veeder Root Model 101, which is commonly used in gasoline-dispensing equipment.

In accordance with the invention, pulser means provide pulses proportional to the rotations of the shaft. As embodied herein, the output drive shaft 19 is connected into the pulser 20 which provides pulses to the electronic logic package 22 through a low voltage wire conductor 32. The pulse-generating apparatus 20 may be, for example, of a type disclosed in U.S. Pat. No. 3,814,934 granted to Mesh et al and assigned to the assignee of the instant invention.

The shaft 16 is coupled into a mechanical gallon volume counter (not shown), as well known, the gallons of each sale being continuously reflected in gallons of sale wheels 34.

The rotation of the shaft 16 also drives a mechanical gallonage totalizer 36, and, in conjunction with unit price-adjusting equipment and a mechanical money totalizer transfer gear 37, as known, drives a total dollar transaction totalizer 38. The mechanical totalizers 36 and 38 reflect the cumulative operation of the gasoline-dispensing apparatus and cannot be reset. The transfer gear 37 is usually mounted on a shaft through the housing 10. In the conservation of space for utilization of the liquid crystal display device, the transfer gear 37 may be conveniently mounted on a bolt 39 threaded into the housing 10.

In accordance with the invention, the electronic logic package 22 and the liquid crystal display package 24 are reset before the next sale through operation of a lever 40.

As embodied herein, the lever 40, acting through a shaft 42, actuates a mechanical reset cam 43 for resetting the gallonage wheels 34, the electronic package 22 and the display device 24 for the next sale.

A cam surface 44 of the reset cam 43 controls an electronic reset synchronizing microswitch 46, establishing the coordination of the electronic elements of the package at the proper timing and the resetting of the display device 24 for the next utilization of the dispensing apparatus. The synchronizing switch 46 is interconnected with the electronic logic module 22 by a low voltage wire conductor 48. The multi-purpose cam surface 44 also activates the cam followers 45 for resetting the gallonage wheels 34.

It should be noted that the shaft 42 is normally in the present gasoline-dispensing equipment, being the operating shaft for resetting the present money and gallonage of sale wheels.

Any electrical or mechanical apparatus of the gasoline-dispensing equipment, as for example the power supply, may also be regulated by action of the reset lever 40 by circuitry in a box 50 or by mechanical devices known in the art.

In accordance with the invention, means are provided for rendering the pulser means, the display means and the electronic logic means intrinsically safe in explosively hazardous locations.

As embodied herein, low voltage wire conductors 32, 48, 60 interconnecting the pulser 20, the synchronizing microswitch 46 and a power supply junction box 58, respectively, with the electronic logic package 22 constitute an intrinsically safe electrical access to the computing package 22 and display 24 for use with the gasoline-dispensing apparatus, compatible with the standards of the Underwriters' Laboratories.

Figure 3:
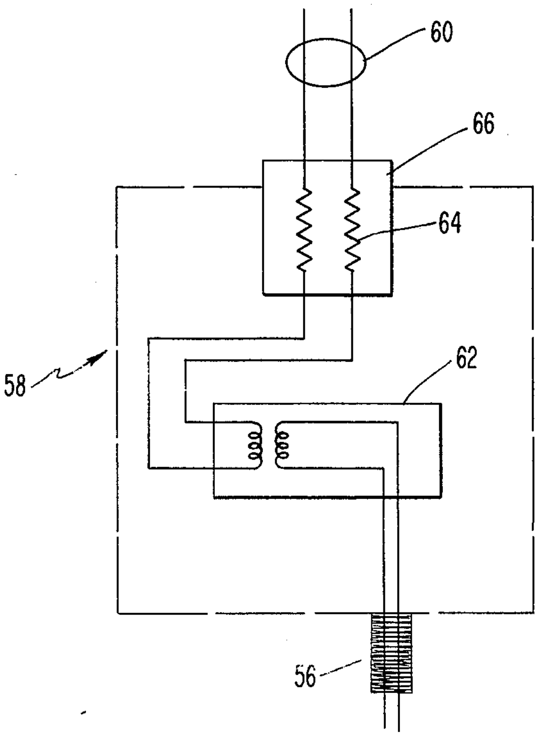
FIG. 3 is a schematic diagram of an explosion-proof junction box for use in the sale computing and display package of FIG. 2.

As shown in FIG. 3, and in accordance with the invention, the power supply junction box 58 is explosion-proof and reduces the voltage and amperage in the standard 120 vac conduit 56 to an intrinsically safe combination of voltage and amperage used in the low voltage wire 60. This low voltage and current is also utilized in the other wire conductors 32, 48 and throughout the sales computing and display apparatus.

As embodied in FIG. 3, the explosion-proof junction box 58 encloses a transformer 62, for reducing the voltage furnished from conduit 56, and resistors 64, for reducing the current flow to an intrinsically safe combination, as required by standardizing agencies such as Underwriters' Laboratories. The box 58 contains intrinsically safe internal shields and barriers shown symbolically by the barrier nipple 66, conforming to the safety requirements for gasoline-dispensing equipment.

In accordance with the invention, electronic logic means are provided for receiving pulses from the pulser means and supplying signals for actuating a light-transmissive liquid crystal display panel.

Figure 4A:
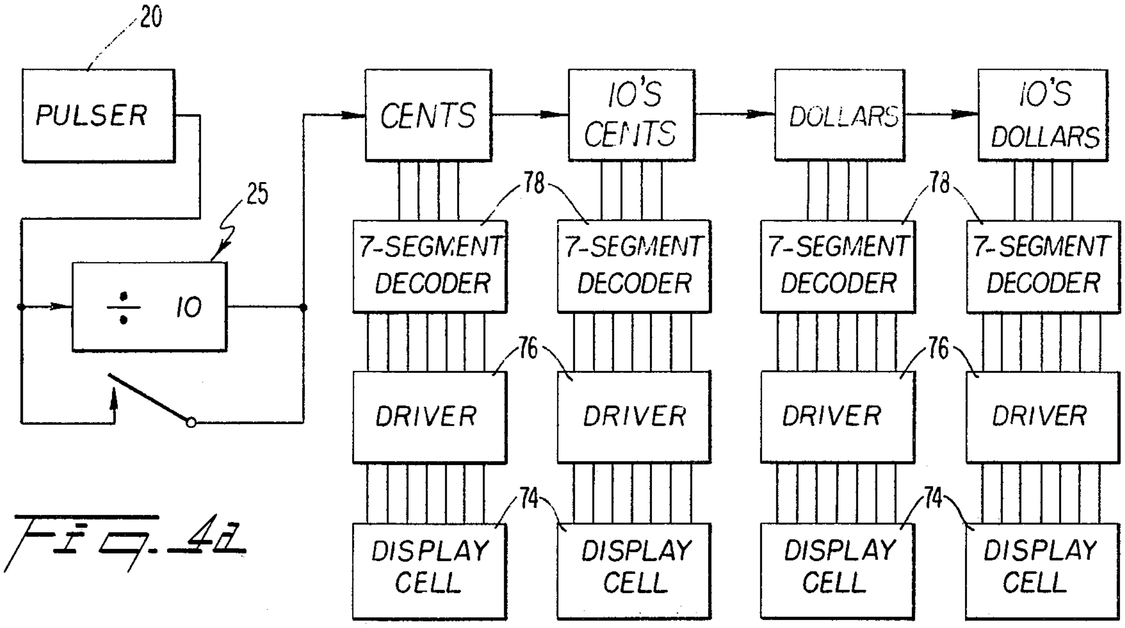
FIGS. 4*a*, 4*b* and 4*c* show block diagrams of electronic logic for use in the sale computing and display package of FIG. 2.

As embodied herein, the electronic logic package 22 converts the pulses generated by the pulser 20 at least into sale price for display in one or more units of the liquid crystal display device 24. The pulse-generating apparatus 20 may be set to provide pulses representing, for example, 1/10 of a cent. As illustrated in FIG. 4*a*, the electronic logic 22 may include a decade counter which accumulates the pulses sequentially as cents, 10's of cents, dollars and 10's of dollars as binary data, as well known in the computer art. As explained hereinafter, the accumulating binary data, as to price of sale, are continuously converted into seven-segment code for read-out by the liquid crystal display device 24.

The electronic logic 22 may include, if desired, circuitry, shown generally as 25, for converting the output of pulser 20 by multiples of 10, as known in computing logic for purposes explained hereinafter.

Figure 4B:
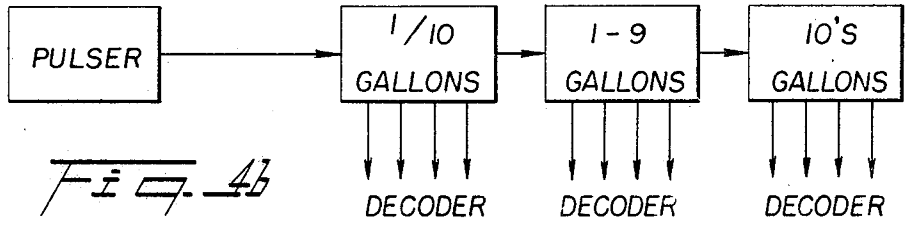

As embodied herein, the pulse-generating apparatus 20 may also include a pulsing device actuated by the shaft 16 for generating pulses representative of the volume of gasoline being dispensed. This pulser may, for example, provide pulses representing 1/10 of a gallon. As illustrated in FIG. 4*b*, the electronic logic 22 may include a decade counter for totaling the volume of gasoline dispensed in a sale. The binary data accumulating in the counter may be simultaneously read out through decoders to a display device 24 for continuous viewing by the customer.

As an alternative embodiment of the invention, the variator 18 may be dispensed with and the rotation of the shaft 16 from the flow-meter 12 may be converted electronically to data representative of price, gallonage, total accumulated volume dispensed and the sale value by electronic logic. Such an electronic computing package is disclosed in U.S. Pat. No. 3,809,866 to Scoville, of common assignee with this application.

In accordance with the invention, there is provided display means including a light-transmissive liquid crystal display panel and a prism for back-lighting the display panel.

As embodied herein, the liquid crystal display device 24 is mounted in the housing 10 by a frame 68 in which the display device is retained. As further embodied in FIG. 5, the display device 24 includes a liquid crystal display panel 70 and an optical prism 72. The panel 70 is divided into cells 74, each of which contains a seven-segment numeral, each segment being individually controlled by an electrode (not shown), as known in the art.

The liquid crystal display panel 70 in one embodiment includes four cells 74 displaying a price up to $99.99 in the space previously occupied by three mechanical read-out wheels with a total display capacity of $9.99. It is apparent that the concepts of the invention may be utilized in display panels having more than four cells and for purposes other than expansion of capacity. As previously stated, the rapid wear of mechanical apparatus, due to the increased price of gasoline, is necessitating the replacement of such apparatus regardless of its capacity.

A seven-element driver 76 (FIG. 4*a*) is associated with each display cell 74 under control of a decoder 78, as known in the art. The decoder 78 and the driver 76 for the individual cells may, for example, be located in the electronic logic package area.

As embodied herein and illustrated in FIG. 5, the frame 68 may include a panel 80 overlying the present gallonage read-out wheels 34 and a panel 82 overlying the present price per gallon wheels 28. Alternatively, the gallonage of the sale may be reflected through accumulating binary data, as represented in FIG. 4*b* and read out through seven-segment decoders and drivers to display panel cells located in the gallonage read-out panel 80.

Even though the price of gasoline/gallon increases to $1.00 or more, the variator may continue to be used by setting the price wheels to 1/10 of the current price and then by multiplying the number of pulses from the pulser 20 by 10 by the circuitry 25 described above. The price per gallon, in excess of 99.9 cents, however, can be fitted into 4 spaces of electronic display previously required by 3 spaces of mechanical display, as shown in panel 80.

It is of importance to note that in one embodiment of the invention the read-out display included in the frame 68, with all its information, may be positioned in the housing of the gasoline pump in the area usually containing the mechanical wheels without major modification of the housing. It is obvious, however, that the principles of the invention can be incorporated in sale computing and display apparatus and gasoline-dispensing apparatus designed particularly for its use. For example: The display device of the invention could be located at a remote position rather than in the area formerly occupied by the mechanical read-out wheels.

In accordance with the invention, the liquid crystal display panel includes means to provide faster response time and better readability.

Figure 6A:
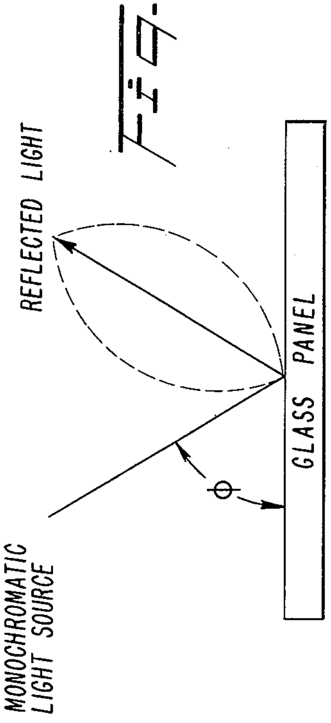
FIG. 6 is a cross-section of the liquid crystal display device of the display apparatus taken along line 6—6 of FIG. 5.
Figure 6B:
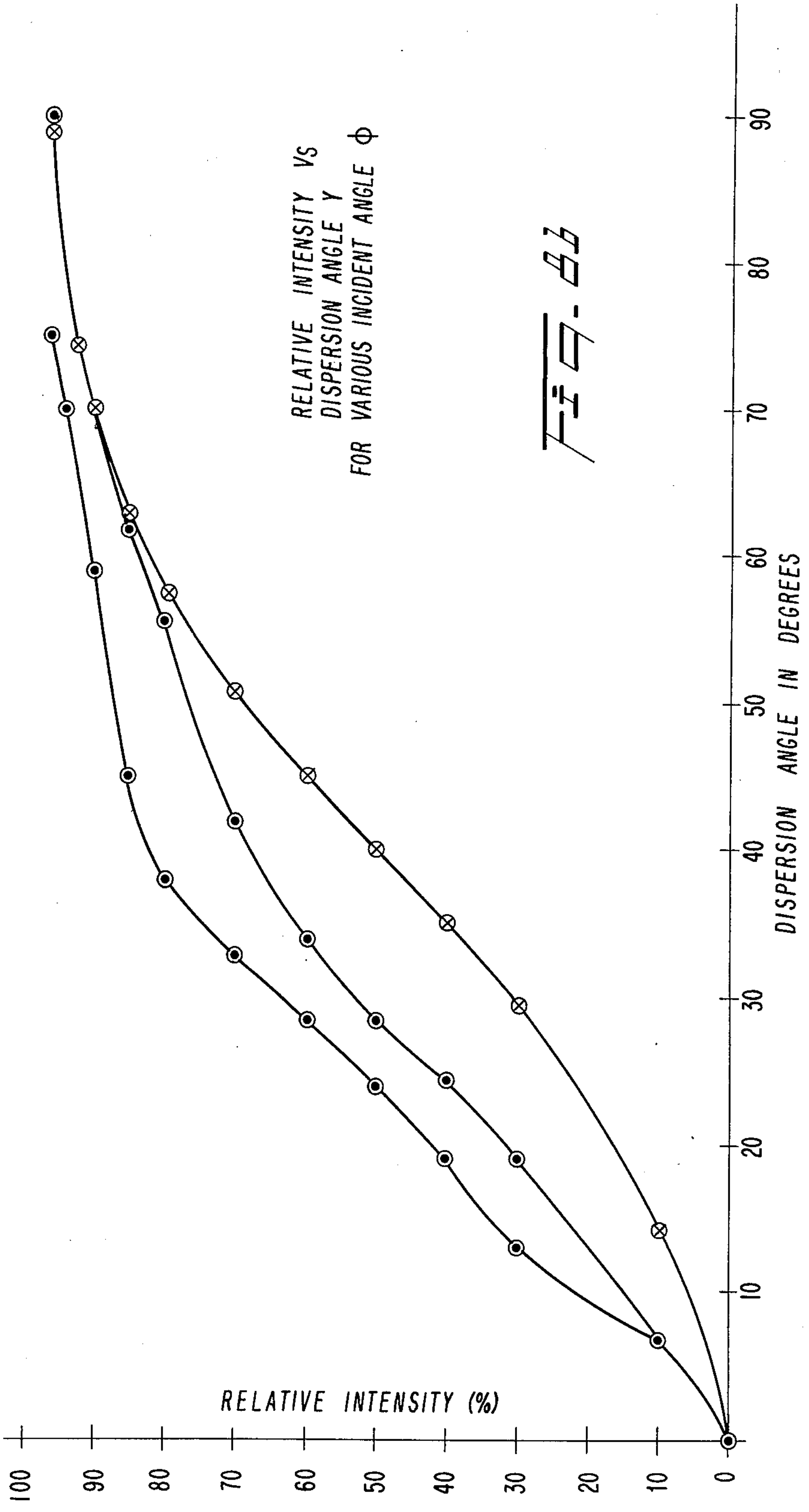

Each liquid crystal display cell 74, as shown in cross-section in FIG. 6 is formed of a plurality of sheets adhered together as a unit, as for example, by a strip of epoxy around the contacting edges. These sheets include the customary elements of a liquid crystal cell, namely, a character sheet 84 and a segment sheet 86 sandwiched between two polarizer sheets 88.

The liquid crystal display panel 70, although composed of cells 74 each having its own electrodes, is nevertheless formed of sheets extending entirely across the width of the panel. The character sheet 84, the segment sheet 86 and the polarizer sheets 88, therefore extend across the width of the panel 70.

As embodied herein, the character sheet 84 is preferably of glass and is completely masked except for the segment areas 87, as shown in FIG. 5. Preferably, the character panel is masked in black for blocking out possible light emission from unsegmented portions of the characters of cells 74, thus providing good background contrast for reading the liquid crystal display.

In accordance with the invention, to improve further the legibility of the read-out display, a filter sheet may be inserted in the light paths through the liquid crystal display panel for neutralizing the transmission of "blue" light through unactivated segments of the display panel. As shown in FIG. 9, the filter sheet 89 is preferably glass or plastic with a very high degree of light transmission and containing a color known to cancel "blue" light, such as yellow, red or amber. The filter sheet 89 may be conveniently positioned between the liquid crystal display panel 70 and the prism 72.

Gasoline-dispensing apparatus is exposed to the temperatures of the ambient atmosphere which, in winter weather, may range far below freezing. The liquid crystal display panel, as previously known, however, has a narrow temperature range. The reaction time slows down at temperatures below about 80° F. and the panel is essentially inoperative below about 32° F. In an outdoor environment and in year-round exposure, a liquid crystal display panel has therefore been considered to be of small utility.

In accordance with the invention, the liquid crystal display panel of the display means includes heating means. As embodied herein, the liquid crystal display panel 70 of the invention includes a resistive heater sheet 90 as the innermost element of the panel. As shown in FIG. 7, the heater sheet 90 includes a glass sheet having a coating 91 of resistance heating material, such as indium oxide vapor-deposited on its inner surface, i.e., the surface juxtaposed to the inner polarizer sheet 88.

As embodied herein, electrical connection is made to the resistance coating 91 by thin copper bar strips 92, 93 running laterally across the top and bottom edges of the heater sheet 90 and having firm electrical connection with the indium oxide coating. The top bar strip 92 may, of course, extend across one end of the heater sheet for convenient electrical connection near one end of the bottom bar strip 93. As shown in FIG. 6, the segment sheet 86 has a downwardly extending portion 94 which serves to support the ends 95 of the bar strips 92, 93 for connection to the intrinsically safe source of electrical power.

As embodied herein, the flow of current across the indium oxide coating 91 is controlled by a thermistor 96 (FIG. 6) epoxy-mounted on the surface of the heater sheet 90 which forms the surface of the display panel within the housing 10. The thermistor 96 is connected by conductive ribbon strips 97 to the connection ends 95 of the bar strips 92, 93. As well known, a thermistor is a temperature-sensitive device for resistively controlling current flow.

The thermistor is preferably set at about 95° F. for maximum efficiency in maintaining the liquid crystal display panel 70 at a temperature for reasonably fast reaction time while minimizing power consumption.

Preferably, the bottom bar strip 93 extends only partially across the bottom edge of the heater sheet 90, encompassing only the two right-hand cells 74. For the read-out display of the price of the gasoline sales, the two right-hand cells 74 reflect the cents portion of the sale price, and must react much more rapidly to the accumulating sale price than the two left-hand cells representing the dollars of the sales price. The thermistor 96 is preferably located on the surface of the heater sheet 90 opposite the two right-hand cells 74, thus optimizing the reaction time and heat utilization.

It has been found that the heat developed across the indium oxide coating 91 between the full length upper bar 92 and the half-length lower bar 93 is sufficient to maintain an adequate reaction time of the liquid crystal cells 74, while keeping the power consumption below that required by the rules of intrinsic safety.

The polarizer sheets 88 are oriented at right angles to each other, as well known, with the result in the prior art that the light emitted from a light crystal display panel is normal to the panel and visible only from a position directly in front of the panel. The limited visibility angle of the liquid crystal panel has greatly limited the usefulness of such panels in the prior art.

In accordance with the invention, the liquid crystal display panel 70 includes a light diffuser sheet or plate 98 as a unitary part of the panel.

As embodied herein, the light-diffuser sheet 98 comprises the outer element of the display panel 70, as shown in FIG. 6. The viewing surface 99 of the sheet 98 is provided with a matte surface to diffuse the light issuing from the display panel 70.

A plain glass sheet of high transmissivity of light will transmit about 96% of light normal to the plane of the sheet. It has been found that a matte finish transmitting about 80% of such light will diffuse the otherwise polarized light of the liquid crystal display panel. Preferably, to form the light diffuser sheet 98 a plain glass sheet of high light transmissivity is lightly sandblasted and then lightly etched to remove any roughness resulting from the sandblasting.

Monochromatic light incident on the surface of a glass sheet at an angle $\phi$ is reflected at an angle $\gamma$. On a smooth surface the angle $\phi$ will equal the angle $\gamma$, as shown in FIG. 8*a*, as well known. However, when the glass sheet has a matte finish, the angle of reflection $\gamma$ is not equal to the angle of incidence $\phi$.

In accordance with the invention, a matte finish suitable for the diffusion of the polarized light of a liquid crystal display panel, for example, will disperse light incident on the surface at 40° at an angle of 45° at a relative intensity of 60%. The graph of FIG. 8*b* shows criteria for the matte surface wherein the dispersion angle of light is plotted against the intensity of light reflected for incident angles of 40°, 50° and 60°.

As embodied herein, a diffusion sheet 98 with a matte surface 99, having the characteristics shown in FIG. 8*b*, will provide a liquid crystal display panel with a readable surface for angles of viewing necessary, for example, in the read-out of gasoline dispensing equipment.

With the increased price of gasoline, the cents character in the cell 74 farthest to the right changes so rapidly that even with excellent reaction time there is a tendency to overrun a predetermined sale price. This is particularly true as to an inexperienced purchaser at a self-service pump. Assuming an intended $5.00 purchase, for example, the speed of the pump can be misjudged and more than $5.00 worth of gasoline can be pumped into the purchaser's tank before the flow is stopped.

In accordance with the invention, there are provided auxiliary visual means correlated with characters of the liquid crystal display panel.

As embodied herein, a vertical line of sequentially actuated dots of light, forming a bar graph, is associated with the right-hand cells 74 continuously indicating the advancing sale price, as sales of 10 cents are accumulated. As shown in FIG. 5, a vertical sequence of points 102 of liquid crystal display light is aligned to the right of the right-hand cell 74, representing the cents of sale. Preferably, there is a series of five lights, representing 2 cents, 4 cents, 6 cents, 8 cents and 10 cents worth of gasoline dispensed.

As the lights 102 are sequentially lighted, it is a simple matter for even an inexperienced purchaser to foresee the approach of the predetermined amount of gasoline purchase.

Figure 4C:
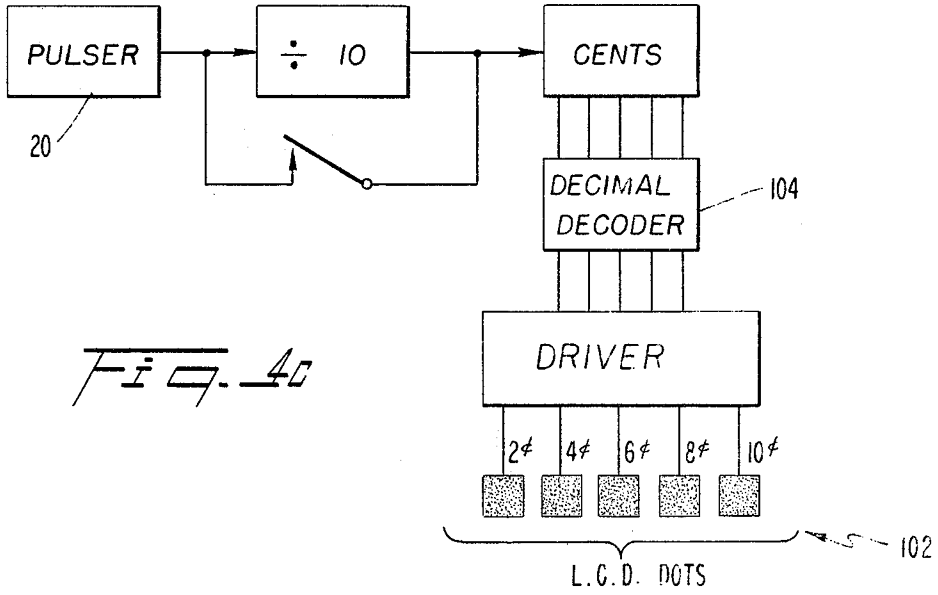

As shown in FIG. 4*c*, the actuation of such a sequence of liquid crystal display lights may be an adjunct of the decade counter of FIG. 4*a*. The binary data accumulating in the cents counter, in addition to being fed to the seven-segment decoder 78, may be fed to a decimal decoder 104, for actuating the lights 102 successively as each sale of 2 cents of gasoline is dispensed.

In accordance with the invention, the display means include means for back-lighting the display panel and combination means for transmitting and reflecting ambient light rays rearwardly of and outwardly through the display panel.

In the present embodiments, the liquid crystal display panel 70 is light-transmissive and the optical prism 72 is so fabricated as to gather the ambient light from the area in front of the panel, i.e., outside the internal housing 10, deflect and reflect the light, so gathered, behind the panel and outwardly through the panel to the viewer. It is obvious that the prism of the invention may be formed to gather light from any sector for back-lighting the display panel.

This aspect of the invention is of particular importance in the utilization of cost-of-sale and/or volume display in gasoline-dispensing apparatus. Crystal displays are normally not feasible because of inadequate contrast giving poor readability. Furthermore, because of the danger of explosions, it is not safe to provide a source of artificial light behind the panel for back-lighting the display. By the present invention, back-lighting of the liquid crystal display is obtained resulting in the brightness necessary for good readability, and this has been done by using, if necessary, only light available outside the housing of the gasoline-dispensing equipment.

As embodied herein and shown in FIG. 9, the optical prism 72 is effective to transmit light received from an arc of 180° in a plane normal to the viewing surface of the panel.

The liquid crystal display panel 70 has a planar viewing surface 106 substantially parallel to the plane of the front of housing 10 and a rear surface 108 parallel to the viewing surface. In the embodiment of FIG. 9, the prism 72 gathers light E1 and E2 through two planes extending outwardly from the housing 10, reflects the light around one side and to the rear of the panel 70 and outwardly through the rear surface 108 and the viewing surface 106 to the viewing area F.

As further embodied herein, the optical prism 72 is formed to have a light-receiving area above the panel 70. At the top of the prism 72, a plane 110 may extend outwardly from the frame 68, the plane 110, as mounted, extending downwardly from a horizontal plane by an angle of, for example, about 14° to 20°. The outwardly extending plane 110, as illustrated, intersects another plane 112 of the prism 72 at an acute angle thereto, the plane 112 terminating substantially at the upper edge of the panel 70.

The liquid crystal display panel 70 is preferably offset outwardly from the plane of the housing 10 to provide space for the portions of the prism extending partially into the housing 10. With the panel 70 so offset outwardly, the acute angle between the planes 110 and 112 in the illustrated embodiment is preferably about 73°.

The angle of the plane 110 with a vertical plane is such that light E1, entering the prism 72 from above the prism through the plane 110, is reflected horizontally and normal to the plane of the viewing surface 106. In addition, ambient light rays E2 entering through the plane 112 are transmitted substantially normal to the plane of the viewing surface 106.

The prism 72 is formed with a plane 114 parallel to and proximate the rear surface 108 of the panel 70, and intersecting the plane 112. If desired, the planes 112, 114 may be interconnected by an offsetting plane at the side of the panel 70.

As embodied herein, the inner edge of the plane 110 and the lower edge of the plane 114 are interconnected by three planes intersecting such that light beams E1 and E2 traveling horizontally through the prism 72 are totally reflected downwardly by a plane 116 and then outwardly by a plane 118 in a horizontal plane through the panel 70. A relatively short filler plane 120 between the lower edges of the planes 114 and 118 provides the proper angles for the planes of the prism.

Preferably the latter three planes 116, 118 and 120, which only reflect light, are vacuum-plated to produce a commercial quality reflective mirror suitable for protected outdoor application, such as temperatures ranging from −40° F. to 150° F. and 100% relative humidity.

It is apparent that the arrangement of the planes of the prism 72 in FIG. 9 is purely illustrative, and other arrangement of planes may be used, as convenient.

The prism 72 is preferably fabricated of acrylic plastic and all the light-transmissive and reflective planes are of optical quality, being smooth and free of noticeable scratches. However, the prism 72 can be fabricated from any optical quality light-transmissive material such as glass.

As indicated above, the display panel 70 is preferably offset outwardly from the plane of the housing 10. A bracket 122 may be attached to the frame 68 for supporting the panel 70 and the prism 72, the bracket having arms 124 extending upwardly along the front of the panel and near the edges thereof. For maximum protection the prism 72 may rest on a resilient member or members such as a spring 126 and supporting surfaces of the prism 72 and the panel 70 may be protected by foam padding.

The formulation of the prism 66, as embodied in FIG. 9, has been found to be very satisfactory for back-lighting the light-transmissive liquid crystal display panel 72 and is a part of the preferred embodiment of the invention.

In accordance with the invention, as embodied in FIG. 10, the optical prism 72A is effective to transmit light received from an arc of at least 90° in a plane normal to the viewing surface 106 of the display panel 70.

In the embodiment of FIG. 10, the optical prism 72A has a single plane 128 for receiving light from the area outside the housing 10, i.e., in front of the plane of the viewing surface 106 of the panel 70. The upper edge of the plane 128 intersects at an acute angle with the back plane 116A, the planes 116A, 118A and 114A of prism 72A being arranged, respectively, and serving the same purpose as the planes 116, 118, and 114 of the prism 72 of FIG. 9. The prism 72A is retained in the housing 10 by the frame 68 by any convenient means.

Although a display device is shown only on one side of the housing 10 as embodied in FIG. 2, it is apparent that display devices may be utilized on at least opposite faces of the housing 10. It is also apparent that the display devices of the invention may be used to display either the sale price or the number of gallons of gasoline sold or both. Likewise, a pair of the display devices of the invention can be used in conjunction with each other to show both the number of gallons of gasoline dispensed and the sale price.

The sale price computing and sale display package of the invention provides a means for supplying present models of gasoline-dispensing pumps with the most modern and efficient equipment for computing the sale price and gallonage of gasoline dispensed, with only minor modification of the present equipment.

Although the computing and display apparatus of the invention has been described in the environment of gasoline dispensing equipment, it is evident that the apparatus of the invention is equally useful in monitoring the revolutions of a shaft in any environment and developing data therefrom for display with particular utility in locations made hazardous by potential gaseous explosions.

It will be apparent to those skilled in the art that various modifications and variations could be made in the sale computing and display package of the invention without departing from the scope or spirit of the invention.

What is claimed is:

1. In an apparatus for monitoring the revolutions of a shaft, the improvement comprising:
   (a) pulser means for providing pulses proportional to the rotations of the shaft;
   (b) display means, including a light-transmissive liquid crystal display panel and a prism for back-lighting said display panel; and
   (c) electronic logic means for receiving pulses from said pulser means and supplying signals for actuating said display panel, wherein said liquid crystal display panel includes a plurality of segmented characters and means for blocking "blue" light from transmission through unactivated segments of said segmented characters.

2. In gasoline-dispensing apparatus including a housing, a rotatable shaft, the rotations thereof being representative of the amount of gasoline being dispensed, and pulser means for providing pulses proportional to the rotations of said shaft, sale computing and display apparatus comprising:
   (a) sale display means including a liquid crystal display panel, having a planar viewing surface, mounted on said housing, said viewing surface including means for improving the readability of said panel;
   (b) electronic logic means for receiving pulses from said pulser means, converting said pulses and supplying signals for actuating said display panel; and (c) means for effecting intrinsic electrical safety for said display means and said logic means including explosion-proof junction box means, means therein for reducing incoming voltage and means therein for reducing current flow to said display means and logic means.

3. The sale computing and display apparatus of claim 2 wherein said liquid crystal display panel is a unitary arrangement of parallel sheets including a light-transmissive sheet forming the viewing surface of said panel, and wherein said means for improving the readability of said panel includes light-diffusing means on said viewing surface.

4. The sale computing and display apparatus of claim 3 wherein said light-diffusing means includes a sand-blasted and polished surface.

5. The sale computing and display apparatus of claim 4 wherein said polished surface is chemically etched.

6. The sale computing and display apparatus of claim 3 wherein said unitary arrangement of parallel sheets includes a character sheet including individual segments for forming characters and wherein said character sheet is masked for blocking out "blue" light emission except for the areas of said segments.

7. The sale computing and display apparatus of claim 6 wherein said character sheet is masked with black paint.

8. The sale computing and display apparatus of claim 6 wherein said display means also includes a color-containing sheet for blocking "blue" light from transmission through unactivated segments of said characters.

9. In gasoline-dispensing apparatus including a housing, a rotatable shaft responsive to the amount of gasoline being dispensed and pulser means for providing pulses proportional to the rotations of said shaft, sale computing and display apparatus comprising:

(a) sale display means including electronically controlled characters representative of the accumulating amount of the sale and auxiliary visual means correlated with said characters; and (b) electronic logic means for receiving pulses from said pulser means, converting said pulses and supplying signals based thereon for actuating said electronically controlled characters and said auxiliary visual means, wherein said auxiliary visual means include a plurality of points of light sequentially lighted with the increasing amount of the sale.

10. The sale computing and display apparatus of claim 9 wherein said sequentially lighted points of light form a bar graph.

11. The sale computing and display apparatus of claim 10 wherein said characters include the cents land tens of cents of the sale and said plurality of points of lights is sequentially lighted during each ten cents of sale.

12. A sale computing and display relplacement package for gasoline-dispensing apparatus using the rotations of a shaft for metering the gasoline being dispensed and mechanical read-out wheels for displaying the amount of the sale, said replacement package comprising:

(a) pulser means for providing pulses proportional to the rotation of the shaft;

(b) sale display means including electronically controlled characters representative of the accumulating amount of the sale for replacement of said mechanical read-out wheels;

(c) electronic logic means for receiving pulses from said pulser means, converting said pulses, and supplying signals for actuating said electronically controlled characters; and (d) means for effecting intrinsic electrical safety for said pulser means, said display means and said logic means, including explosion-proof junction box means, means therein for reducing incoming voltage and means therein for reducing current flow to said display means and logic means.

13. The sale computing and display apparatus of claim 12 wherein said liquid crystal display panel includes heating means for maintaining the temperature of said liquid crystal display panel at a level for sufficient operation in a year-round outdoor environment.

14. The sale computing and display apparatus of claim 13 wherein said display panel is a unitary arrangement of parallel sheets and wherein said heating means includes a light-transmissive sheet having thereon an electrically conductive coating and wherein said heating means maintains the temperature of said panel at or above a level of substantially 80° F.

15. The sale computing and display apparatus of claim 14 wherein said coating is indium oxide.

16. The sale computing and display apparatus of claim 14 wherein said heating means includes electrical conductors in electrical contact with said coating for establishing a current flow through said coating across said light-transmissive sheet.

17. The sale computing and display apparatus of claim 16 wherein said electrical conductors are of uneven length for resistively producing more heat in one portion of said coating than another.

18. The sale computing and display apparatus of claim 16 also including heat-sensistive means for controlling the current flow between said electrical conductors.

19. The sale computing and display apparatus of claim 18 wherein said light-transmissive sheet of said heating means forms a surface of said display panel opposite from said viewing surface, said coating is on the surface of said lighttransmissive sheet facing toward said viewing surface and wherein said heat-sensitive means includes a thermistor located on the surface of said light-transmissive sheet opposite said coating.

20. The sale computing and display apparatus of claim 19 wherein said means for reducing incoming voltage includes a transformer and said means for reducing current flow includes resistors.

21. The sale computing and display apparatus of claim 17 wherein said light-transmissive sheet of said heating means forms a surface of said display panel opposite from said viewing surface, said coating is on the surface of said lighttransmissive sheet facing toward said viewing surface and wherein said apparatus also includes a thermistor located on the surface of said light-transmissive sheet opposite said one portion of said coating.

22. A liquid crystal display device comprising:

(a) a light-transmissive liquid crystal display panel having a planar viewing surface, and (b) an optical prism including means for gathering light from forward of the plane of the viewing surface only and for transmitting the gathered light for backlighting said display panel.

23. The liquid crystal display device of claim 22 wherein said display panel has a rear surface substantially parallel to said planar viewing surface and wherein said back-lighting means includes means for transmitting and reflecting ambient light rays in the area outside said housing rearwardly of the display panel and outwardly through the rear surface and viewing surface of the display panel.

24. The sale computing and display apparatus of claim 23 wherein said light-transmitting and reflecting means includes an optical prism having means for transmitting ambient rays incident thereon in the area forward of the plane of the viewing surface; and means extending rearwardly of the viewing surface of said panel at least for reflecting said tranmsitted light rays back through said display panel.

25. The sale computing and display apparatus of claim 24 wherein said rearwardly extending means of said prism includes at least first and second angularly related light-reflecting planes, said first plane being arranged to reflect said transmitted light rays toward said second plane and said second plane being arranged to reflect light incident thereon from said first plane outwardly through said display panel.

26. The sale computing and display apparatus of claim 25 wherein said rearwardly extending portion of said prism also includes a third plane parallel with said rear surface of said display panel and adjacent thereto for transmitting light through said display panel.

27. The sale computing and display apparatus of claim 26 wherein said light-transmitting means is effective to transmit light incident thereon received along an arc of at least 90° in a plane normal to the viewing surface.

28. The sale computing and display apparatus of claim 27 wherein said light-transmitting means includes a fourth plane of said prism substantially parallel with the plane of said viewing surface.

29. The sale computing and display apparatus of claim 28 wherein said fourth plane intersects said first plane at an acute angle.

30. The sale computing and display device of claim 26 wherein said light-transmittng means is effective to transmit light incident thereon received along an arc of substantially 180° in a plane normal to the viewing surface.

31. The sale computing and display apparatus of claim 30 wherein said light-transmitting means includes at least a fourth plane and a fifth plane extending outwardly from the plane of the viewing surface for gathering and transmitting light into said prism for reflection by said first and second planes.

32. The sale computing and display apparatus of claim 31 wherein said first plane and said fifth plane are substantially parallel and wherein said fifth plane terminates adjacent to one edge of said viewing surface.

33. The sale computing and display apparatus of claim 32 wherein said fifth plane transmits ambient light incident thereon through its outer surface and reflects light transmitted through said fourth plane, the light both transmitted and reflected by the fifth plane being received and reflected by the first plane of said prism.

34. The sale computing and display apparatus of claim 33 wherein each of said first and second planes of said optical prism is vacuum-plated as mirrors to sustain temperatures ranging from −40° F. to 150° F. and 100% relative humidity.

35. The sale computing and display apparatus of claim 25 wherein the outer surfaces of said prism formed by said first and second angularly related planes are light-reflective.

36. In a liquid crystal display panel, the improvement comprising:

heating means for maintaining the temperature of said liquid crystal display panel at a level of 80° F. or above for efficient operation in a year-round outdoor environment;

a unitary arrangment of parallel sheets, said heating means including a sheet having thereon an electrically conductive coating; and electrical conductors in electrical contact with said coating for establishing a current flow through said coating across said sheet, said electrical conductors being of uneven length for resistively producing more heat in one portion of said coating than another.

37. The improvement of claim 36 also including heat-sensitive means for controlling the current flow between said electrical conductors.

38. The improvement of claim 37 wherein said light-transmissive sheet of said heating means forms a surface of said display panel opposite from said viewing surface, said coating is on the surface of said light-transmissive sheet facing toward said viewing surface and whereiin said heatsensitive means includes a thermistor located on the surface of said light-transmissive sheet opposite said coating.

39. In a liquid crystal display panel, the improvement comprising:

means for improving the readability of the panel, wherein said liquid crystal display panel is a unitary arrangement of parallel sheets including a light-transmissive sheet forming the viewing surface of said panel, and wherein said means for improving the readability of said panel includes light-diffusing means on said viewing surface.

40. The improvement of claim 39 wherein said light-diffusing means includes a sandblasted and polished surface.

41. The improvement of claim 40 wherein said polished surface is chemically etched.

42. The improvement of claim 39 wherein said unitary arrangement of parallel sheets includes a character sheet including individual segments for forming characters and wherein said character sheet is masked for blocking out "blue" light emission except for the areas of said segments.

43. The improvement of claim 42 wherein said character sheet is masked with black paint.

44. The improvement of claim 42 wherein said display means also includes a color-containing sheet for blocking "blue" light from transmission through unactivated segments of said characters.

* * * * *

UNITED STATES PATENT AND TRADEMARK OFFICE

CERTIFICATE OF CORRECTION

PATENT NO. : 4,122,524

DATED : October 24, 1978

INVENTOR(S) : Rollin J. McCrory et al

It is certified that error appears in the above-identified patent and that said Letters Patent are hereby corrected as shown below:

Column 13, Claim 11, line 53, change "land" to --and--.
Column 13, Claim 12, line 57, change "relplacement" to --replacement--.
Column 14, Claim 19, line 42, change "lighttransmissive" to --light-transmissive--.
Column 14, Claim 21, line 54, change "lighttransmissive" to --light-transmissive--.
Column 16, Claim 38, line 32, change "heatsensitive" to --heat sensitive--.

Signed and Sealed this

***Twenty-ninth* Day of *May 1979***

[SEAL]

*Attest:*

RUTH C. MASON
*Attesting Officer*

DONALD W. BANNER
*Commissioner of Patents and Trademarks*